May 18, 1937.   S. C. SHIPLEY   2,080,836
PRESSURE OR LIQUID SEAL
Filed Sept. 10, 1934
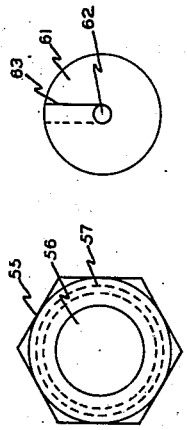
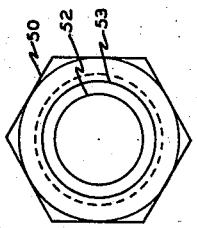
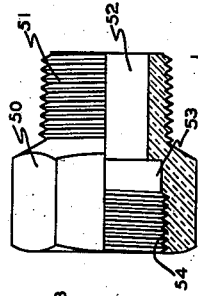
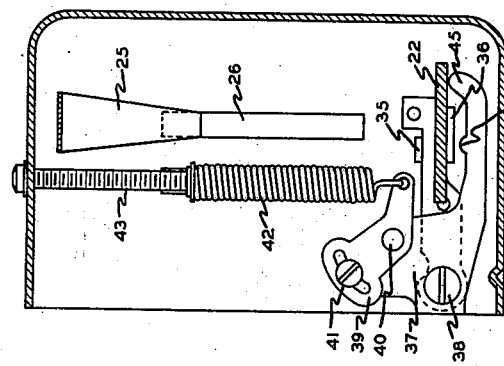
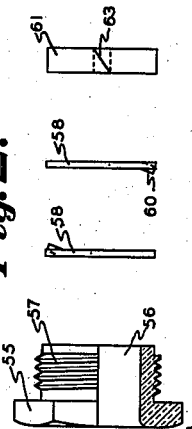
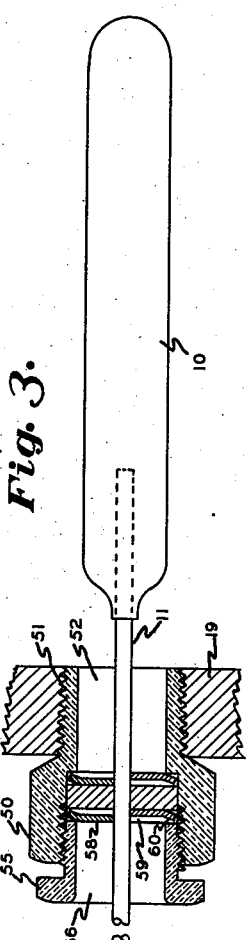
Inventor
Sylvanus C. Shipley
By George H. Fisher
Attorney Patented May 18, 1937

2,080,836

UNITED STATES PATENT OFFICE 2,080,836

PRESSURE OR LIQUID SEAL

Sylvanus C. Shipley, Minneapolis, Minn., assignor to Minneapolis-Honeywell Regulator Company, Minneapolis, Minn., a corporation of Delaware Application September 10, 1934, Serial No. 743,377

7 Claims. (Cl. 285—166)

This invention relates to an improved pressure coupling or liquid seal and its relation with any type of control mechanism and more particularly its relation with a volatile fluid remote control for operating some device according to the temperature affecting the control.

Remote controls of the volatile fluid type for operating devices are generally known and necessitate the use of an enlarged bulb containing the volatile fluid and a capillary tube or flexible piping connection, relatively small in diameter, between the bulb and a volatile fluid pressure responsive means which parts are sealed together, charged with volatile fluid, and calibrated.

Volatile fluid remote control devices which are responsive to temperature changes are used under many circumstances. They are used to operate indicating and recording devices for indicating and recording temperatures and to operate valves and switches of various kinds which are to be responsive to changes in temperature. These remote controls are sometimes placed in open chambers and baths and sometimes in sealed pressure chambers or fluid containing chambers in order to be responsive to changes in temperatures therein. When placed in open chambers or baths no pressure sealing means are necessary and when so used pressure sealing means are not provided. However, when inserted in sealed pressure chambers or fluid containing chambers some pressure sealing means or fluid sealing means must be provided and placed on the piping connection to prevent leakage of pressure or fluid and when so used pressure or fluid sealing means are provided.

From the above, it is seen that in the past, two lines of remote controls had to be provided for each instrument, one for use in baths where no sealing means were used and the other for use in sealed pressure or fluid chambers where a pressure or fluid sealing means must be provided and placed on the piping connection. Having to keep these two lines of controls in stock and the danger of selling the wrong control places an expensive and troublesome burden on the manufacturer and user thereof.

The above difficulties are entirely eliminated by my invention whereby only a single volatile fluid remote control need be provided and used whether the control is to be used in an open bath or in a sealed chamber. This is accomplished by means of an independent pressure or fluid coupling that may be slipped over the enlarged bulb and secured between the small piping connection and the pressure chamber wall to seal the same when the remote control is used in a sealed pressure chamber.

Accordingly, it is an object of this invention to provide a means whereby a single remote control may be used to transmit temperatures to an instrument whether the remote control is used in an open chamber or bath or in a sealed pressure or fluid chamber.

Another object is to provide a pressure coupling that may be slipped over an enlarged portion and pressure seal a small portion.

A further object is to provide a composite washer made of several parts to give the strength and rigidity of a single washer.

Further objects and advantages will become apparent by reference to the specification, claims and drawing in which:

Fig. 1 shows a volatile fluid remote control operatively connected to an instrument with the pressure coupling secured thereon with parts being broken away and shown in section, Fig. 2 is a vertical sectional view of the instrument taken on the line II—II of Fig. 1, Fig. 3 is an exploded view of the pressure coupling showing the component parts thereof in their relative positions, Figs. 4 to 7 are end elevational views of the nut, the slotted washer, the split packing and the plug respectively as viewed from the left in Fig. 1.

The remote control as illustrated in Fig. 1 consists of an enlarged bulb 10 soldered to a capillary tube or piping connection of small diameter 11 which in turn extends to and is soldered to a plug 12 which is riveted and soldered to a bellows chamber 13. A bellows 14 is located in and secured and sealed at its upper end to the chamber 13 thereby forming a pressure responsive chamber between the bellows 14 and the chamber wall 13. Extending upwardly from the bellows is an actuating plunger 15 which translates the movement of the bellows to the instrument to be operated. The plunger 15 is centrally bored and provided with a removable plug 16 which may be removed to charge the control with the required amount of volatile fluid which is selected according to the temperatures which are to be effective upon the instrument.

An increase of temperature in the chamber or in the bath in which the bulb 10 is placed causes vaporization of the volatile fluid in the bulb 10 to create a pressure in the remote control which acts on the outer surface of the bellows 14 to move the plunger 15 upwardly. A decrease in pressure condenses the vapor in the bulb 10 which decreases the pressure in the remote control and permits the downward movement of bellows 14.

The remote control is shown to be used in a refrigeration system in which 19 forms a wall of a sealed pressure chamber, such as a brine containing chamber, in which said bulb is inserted and the control is shown as operating an adjustable differential mercury switch mechanism, generally indicated at 20, according to changes in temperature occurring in the sealed chamber 19. This mercury switch mechanism 20 comprises a stationary pivot 21 upon which is mounted a lever 22, the plunger 15 being operative on one end of the lever 22 and a tension spring 23 being operative on the other end. The tension spring 23 is adjusted by means of a screw 24 to vary the tension in the spring to determine at which temperature the lever 22 will become operative. 25 is an indicator attached to the spring and extends outwardly through a slot 26 in order to give an exterior visual indication of the operative temperature.

Lever 22 is provided with an upstanding arm 27 which arm has a slot and pin connection 28 with a mercury tube carrier 29. This carrier 29 is pivoted for oscillation at 30 and has an eccentric adjustment 31 to adjust the mercury tube with respect to the carrier 29. In the mercury tube are electrodes 32 which are connected by flexible lead wires 33 to the terminal block 34. An increase in temperature in the chamber 19 closes the mercury switch, the parts being shown in the hot position in Figs. 1 and 2. The amount of oscillation of the lever 22 is limited by upper and lower stops 35 and 36 respectively.

A range adjusting lever 37 is pivoted at 38 to the switch housing and has an adjusting arm 39 pivoted thereto at 40. This adjusting arm 39 is adjusted and calibrated by means of screw 41 extending through an elongated slot in the arm 39 and screw-threaded into the lever 37. Secured to one end of the arm 39 is a range adjusting spring 42 which is adjusted by means of a screw 43 and has a pointer 44 extending through a slot similar to the slot 26 in the casing to visually indicate the range of temperatures that are to be effective on the instrument. 45 designates an upstanding lug on the range adjusting lever 37 to engage at certain times the lever 22. An abutment 46 is also provided on the lever 37 to engage the lower stop 36 to limit the movement of this lever 37.

The spring 23 is set for a given temperature at which the device is to become operative and the spring 42 is set to determine the range of temperature required to oscillate the mercury switch from one extreme position to the other. Assuming that the temperature in the sealed chamber increases to the predetermined temperature as determined by spring 23, pressure will be exerted in the chamber 19 to oscillate the lever 22 in a counter-clockwise direction. This movement will be partially resisted by the spring 23 and as the lever 22 is oscillated it abuts against the lug 45 of the range adjusting lever 37 which creates a greater resistance to movement of the lever 22 by reason of the range adjusting spring 42 being stressed. When the lever 22 contacts the lower stop, the switch is closed. The temperature range required to move the switch from the open position to the closed position and vice versa is entirely regulated by the tension in the spring 42 and by increasing or decreasing the tension of the spring 42, the temperature range is increased or decreased respectively.

Mounted on the housing is a pivot 47 which supports an indicating arm 48 which coacts with a marker 49 to determine when the instrument is level.

As stated above, when the control is used in a bath or open chamber, no pressure fluid coupling is necessary but when it is used in a pressure or fluid sealed chamber such a coupling is necessary. The coupling illustrated for this purpose comprises a plug 50, provided with exterior screw threads 51 adapted to fit in the wall of the pressure chamber 19. This plug has an interior bore 52 which is sufficiently large to slip over the enlarged bulb 10. The plug is also counter-bored as at 53 and has internal screw threads 54 formed therein. 55 designates a nut having exterior screw threads 57 to coact with the internal screw threads 54 of the plug. The nut 55 has a bore 56 of the same diameter as the bore 52 of the plug which is sufficiently large to allow the nut to be slid over the bulb 10. Both the plug and the nut are provided with hexagonal heads to facilitate the assembling of the coupling.

By screw-threading the nut 55 in the plug 50, a chamber is formed between the inner end of the nut 55 and the shoulder of the counter-bore 53 of the plug 50 to contain and clamp therein a pressure resisting connection formed by slotted washers 58 and a packing ring 61.

The packing ring 61 has a bore 62 of the same diameter as the capillary tube 11 and is split as at 63 so that the packing may be inserted on the tube.

On either side of the split packing ring 61 is arranged a composite washer formed by two companion washers 58 which have oppositely arranged slots 59 to permit their insertion on the tube 11. These oppositely arranged slots 59 overlap each other in the center of the washer to form a continuous hole through the washers to receive the tube 11 and each washer has an oppositely arranged upturned lug 60 to engage in the slot 59 of the other washer to prevent relative movement therebetween. By placing these two companion washers together in the manner just described, a composite washer that is rigid and strong is thereby formed which affords an efficient reinforcing means for the split packing ring 61.

The coupling is assembled by sliding the nut 55 and the plug 50 over the enlarged bulb 10 to surround the tube 11, inserting one composite washer, the split packing ring and the other composite washer respectively on the tube 11 and in the counterbore 53 of the plug 50 in the relation shown in Fig. 3 and screwing the nut 55 in the plug 50 thereby securing and clamping the ring and washers in place and forming a coupling that is fluid tight and pressure resisting.

From the above, it will be noted that I have provided a pressure coupling of general utility that may couple a rod or pipe having an enlarged end and forming an effective seal for high pressures, and that I also have provided a means whereby only a single remote control comprising a volatile fluid bulb type is required whether it is to be used in an open chamber or bath or in a sealed pressure chamber.

The various details of my invention may be modified without departing from the purpose of the invention which is not limited to the particular embodiment illustrated and described but includes such modifications thereof as fall within the scope of the appended claims.

I claim:

1. A fitting for use on a device including a connecting member having a cross-sectional area smaller than that of the extremities of said connecting member, comprising, a pair of spaced pressure elements each having an opening permitting its being placed upon said connecting member but not sufficiently large to allow the same to be passed over either of the extremities of said connecting member, packing placed between said pressure elements and closely conforming to said connecting member, and means for drawing said pressure elements together to tightly compress said packing upon said connecting member.

2. A pressure fitting for a thermostatic device including a bellows, a thermostatic bulb and a connecting tube of smaller cross-sectional area than that of said bellows or of said bulb, comprising, a pair of spaced pressure assemblies, each assembly comprising a plurality of pressure elements each having an opening permitting its being placed upon said tube but not sufficiently large to allow the same to be passed over said bellows or bulb, interlocking means associated with said pressure elements which positively provide for angularly spacing of the pressure elements, packing placed between said pressure assemblies and closely conforming to said tube, and means for drawing said pressure assemblies together to tightly compress said packing upon said tube.

3. A pressure fitting for a thermostatic device including a bellows, a thermostatic bulb and a connecting tube of smaller cross-sectional area than that of said bellows or of said bulb, comprising, a pair of spaced pressure assemblies, each assembly comprising a plurality of pressure elements each having an opening permitting its being placed upon said tube but not sufficiently large to allow the same to be passed over said bellows or bulb, interlocking means integral with said pressure elements said means comprising a struck-up lip which engages the said opening in the adjacent pressure element so that the openings become angularly spaced, both said lip and opening having a width substantially equal to that of the tube, packing placed between said pressure assemblies and closely conforming to said tube, and means for drawing said pressure assemblies together to tightly compress said packing upon said tube, said compressing means comprising a pair of compression members mutually coactive with one another and both said compression members having longitudinal openings therein sufficiently large to allow passage of the thermostatic bulb.

4. A coupling adapted to seal a tube having an enlarged end in an element having a hole through which said enlarged end is extended comprising a plug adapted to be slid over said enlarged end and secured to said element, a nut adapted to be slid over said enlarged end and secured to said plug, a split packing ring inserted around said tube and slotted reinforcing washers slid over said tube on each side of said split packing ring, said packing ring and said washers being clamped between said plug and said nut.

5. A composite washer comprising companion washers having oppositely arranged slots overlapping each other in the center of said washers to form a continuous hole through said washers and an oppositely arranged inturned lug on each washer to engage in the slot of the other washer.

6. A coupling adapted to seal a tube having an enlarged end in an element having a hole through which said enlarged end is extended comprising a member adapted to be slid over said enlarged end and secured to said element, a second member adapted to be slid over said enlarged end and secured to said first member, packing inserted around said tube, and composite washers inserted around said tube on each side of said packing comprising companion washers having oppositely arranged slots slidable over said tube and a lug on each washer engageable in the slot of the other washer, said packing and said washers being clamped between said members.

7. A pressure seal for a member, comprising packing for said member, composite washers on each side of said packing including companion washers having slots to receive said member and lugs to protrude into said slots, and means for forcing said composite washers into engagement with said packing whereby said packing is compressed to seal said member.

SYLVANUS C. SHIPLEY.